United States Patent [19]

Blandford et al.

[11] Patent Number: 4,936,984

[45] Date of Patent: Jun. 26, 1990

[54] CONSUMER WATER FILTERING APPARATUS

[76] Inventors: Mary Jane Blandford; Robert R. Blandford, both of 1809 Paul Spring Rd., Alexandria, Va. 22307

[21] Appl. No.: 307,534

[22] Filed: Feb. 8, 1989

[51] Int. Cl.$^5$ ............................................ B01D 27/08
[52] U.S. Cl. ........................... 210/250; 210/255; 210/257.1; 210/472; 210/474
[58] Field of Search ............ 210/250, 255, 257.1, 210/262, 282, 472, 474

[56] References Cited

U.S. PATENT DOCUMENTS

| 224,680 | 2/1880 | Green | 210/262 |
| 537,489 | 4/1895 | Sherwood | 210/474 |
| 648,904 | 5/1900 | Hart | 210/474 |
| 889,988 | 6/1908 | Thompson | 210/257.1 |
| 967,905 | 8/1910 | Hagg | 210/474 |
| 1,157,927 | 10/1915 | Davis | 210/474 |
| 2,502,298 | 3/1950 | White | 210/474 |
| 3,536,197 | 10/1970 | Ward | 210/472 |
| 4,094,779 | 6/1978 | Behrman | 210/474 |
| 4,419,235 | 12/1983 | Sway | 210/474 |

*Primary Examiner*—Frank Spear
*Assistant Examiner*—Joseph Drodge

[57] ABSTRACT

A water-filtering apparatus comprising two substantially identical containers each with a water-dispensing valve on the side near the bottom, and a hole in the top. A filter is rested in the hole of the first of the containers. The second container is filled through its hole with water, elevated by some means such as a table or box above the first container, and the water is allowed to flow out of the upper valve, through the filter and into the lower container.

3 Claims, 1 Drawing Sheet

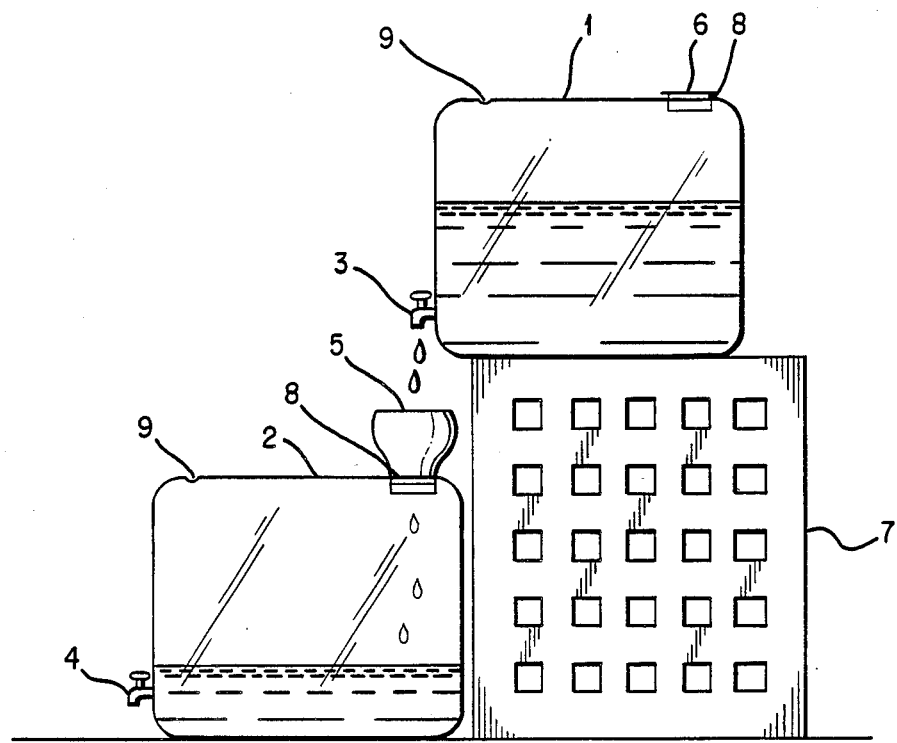

CONSUMER WATER FILTERING APPARATUS

BACKGROUND OF THE INVENTION

The present invention relates to filtering apparatus for purifying a few gallons of drinking and cooking water.

At present consumers may purchase plastic 2-3 gallon plastic containers of purified water at supermarkets. Some of these containers have a small valve on one side, thus the containers may be placed in a home refrigerator, and the water dispensed cold directly into a drinking glass. However, conveying these filled, and therefore heavy and bulky, containers home is awkward, and there is no convenient facility available for refilling the container with freshly filtered water and thus minimizing the high retail cost and the waste of throw-away plastic containers.

There have been a number of inventions teaching apparatus whidch use gravity to carry water from one container through a filter to another. In order to provide background information so that this invention may be completely understood and appreciated in its proper context, reference is made to a number of prior art patents as follows:

The Sherwood U.S. Pat. No. 537,489 shows two boxes connected by a hinge. The upper box is not actually a container as its bottom is actually a filter through which water can flow. The apparatus may be filled from above and the water flows through by gravity. The upper box is positioned directly over the lower container-box which has a valve on the side. Since the lower container is hinged to the upper box, space would be wasted if the apparatus were placed in the refrigerator.

The White U.S. Pat. No. 2,502,298 shows two identical containers each with a single opening. By use of a complex structure to support the inverted upper container, the water flows by gravity through a separate filter to fill the lower container. The fact that there is only a single opening to the containers makes it necessary to have a complex supporting structure so that the upper container can be inverted directly over the lower container. It is apparent that this patent is directed toward the containers used in office water fountains which might be expected to be refilled at a central location where such a complex and rugged structure could be justified financially.

The Ward U.S. Pat. No. 3,536,197 has means for connecting the filter in vertical alignment to the upper container. There is a one-way ball valve in the bottom of the upper container to allow air to enter the container after it is turned over so that the water can flow out, and yet not to let the water flow out while the container is being filled while upright. This valve can not be used to allow water to flow through it to dispense water from the container. There is no valve attached to the lower container, so it cannot be used as a dispenser.

The Behrman U.S. Pat. No. 4,094,779 is similar to that of White, above, except that there are valves controlling the single opening for each of the two containers in order to make it simple to invert the upper container without spilling, and to slow the rate of flow should the water not be in contact with the filtering medium long enough at a higher rate of flow. Behrman specifically mentions the requirement fo inverting the upper container.

The Sway U.S. Pat. No. 4,419,235 has means for connecting the filter in vertical alignment to the upper container. There is no valve attached to the lower container so that it cannot be used as a dispenser.

The White, Behrman, and Sway references teach that the containers are symmetrical about a vertical axis. Thus to filter the outflow from one container into the other, the containers are deployed one directly above the other. This typically requires complex, yet strong structures. The Sherwood reference, while not depicting a perfectly symmetrical system, in that the lower container has a valve on the side, nonetheless has the feature that the flow from the upper container emerges from directly underneath, thus requiring that the two containers be deployed directly one above the other and thus requiring that the supporting structure, in this case the containers themselves, be strong and stable.

Whatever the precise merits, features, and advantages of the above cited references, none of them achieves or fulfills the purposes of the present invention.

SUMMARY OF THE INVENTION

It is an object of the present invention to provide an inexpensive, convenient, and simple means of filtering a relatively large volume (several gallons) of water, and of dispensing the cooled and filtered water at home.

It is also an object to eliminate the requirement for a complex and strong supporting structure to hold one full container of several gallons of water directly above another.

It is also an object to minimize the waste inherent in purchasing filtered water in throw-away plastic containers.

The foregoing objects can be accomplished by providing two substantially equal containers of aproximately 2½ gallons volume, each with a hole on the top suitable for pouring water in; and each with a water-dispensing valve on the side near (~1") the bottom. No portion of the valves are to protrude beneath the containers in order that each may be placed upright on any flat surface.

A filter containing activated charcoal or some similar filtering means is placed in the hole on the top of the lower container. The upper container is filled with water and placed on a stand or table above the lower container, which is on the floor, so that the water leaving the valve on the upper container flows into the filter. Since the lower container is of approximately equal volume to the upper, when the filtering is complete the lower container does not overflow.

When the filtering is complete, the lower container may be placed in the refrigerator and water withdrawn through its valve. A plug is to be provided to close the hole through which water enters the containers; and a simple air leak is also to be provided, so that water can come out through the valve.

By the use of two containers we eliminate the need to monopolize a tap during the filtering operation.

BRIEF DESRIPTION OF THE DRAWING

FIG. 1 is a side elevation of a filtering system in accord with the present invention.

DETAILED DESCRIPTION

Refer now to FIG. 1, which is a side view of a preferred embodiment of the invention.

The containers, 1 and 2, are of plastic, of heavy enough gauge to stand by themselves either empty or full and to withstand frequent use. The containers may be molded, as known by workers in the container art, to make the containers more rigid, and to provide handles for carrying. The gauge of the containers used commercially for bottled water in supermarkets are in the thinnest range of acceptability. The containers contain 2½ gallons and are of approximate dimensions 10" tall by 12" long by 6" wide. The plastic is translucent so that the level of the water within may be easily estimated and the progress of the filtering easily judged.

The holes, 8, in the top of each container are at the opposite end from the water-dispensing valves, 3 and 4, centered 2⅛ from the end, and are of diameter 2⅞", so as to accept the lower lip of the inexpensive activated carbon filters, 5, which are available, for example, from P.M. Enterprises of Woodstock, Vermont.

The containers for filtered water which are for sale in supermarkets do not have such a hole; such a hole is essential for this invention.

It is only necessary that the filter rest stably in the hole because leakage of air around the filter is not a cause for concern, and may, in fact, be desirable in some embodiments so that the rate of flow through the filter is not restricted to that attainable by back-flow of air through the filter. In the preferred embodiment there is a small (⅛") hole, 9, in the upper surface of each container to serve as an air leak.

The filters from P.M. Enterprises comprise a cylinder of plastic, of 3¼" height tapering from a diameter of 4½" at the top to a constant 2⅝"for the last ¼" at the bottom. The cylinder is open at the top, and within, from top to bottom, contains the removable elements: a wire mesh screen, a 2-3" layer of activated carbon, a fine cellulose paper finishing filter, another wire mesh screen, and finally a screw-on cover with a small (~¼") hole through which the filtered water emerges.

The water-dispensing valves, 3 and 4, can be set manually and can stably control the rate of flow over the range required for filtering and serving. For filtering, a desirable flow rate is 2½ gallons in 45 minutes. The valves are to have a detent to help the user set this flow rate. Valves of this sort are easily manufactured by those skilled in the art of valves.

The valves are on the side so that the containers do not have to be deployed directly above each other and so that the containers can be set upright on any flat surface without special support. Naturally, if the valves are on the side, some water may remain in the upper container after filtering ceases, however this is not a serious problem in practice, and in fact ensures against overflow of the lower container.

A plug, 6, is to be provided to seal each hole, 8 to keep out dust and dirt. It is only necessary that the plug fit snugly, as the containers need not be roughly handled or turned upside down in normal use so that there is no requirement that small amounts of air not leak around the hole, nor that the plug be difficult to jar loose.

In use, the upper container would be nearly filled with water and placed on a support, 7, of some type with the valve, 3, projecting over the edge of the support. In the preferred embodiment the support would be a plastic "milk carton" type box large enough to hold two of the containers, and with a maximum outside dimension of 15". Suitable outside dimensions overall would be 15"×13"×11". The 15" dimension is placed in the vertical thus giving adequate elevation so that the outlet of the valve, 3, is above and easily clears the surface of the filter, 5. The long 12" side of the container, 1, is placed in alignment with the 13" side of the box.

When the containers are not being used, they may be conveniently stored in the box.

The filter, 5, is rested in the hole 8, of the lower container, 2. The valve, 3, in the upper container positioned over the filter and is opened for a flow rate of approximately 2½ gallons per 45 minutes. The valve in the lower container, 4, is of course closed.

When the flow from the upper container, 1, ceases, a plug, 6 may be placed in the hole 8, to seal the lower container, 2, and the filled container placed in the refrigerator.

In another embodiment of the invention the holes on the upper surface of the containers could be sealed with screw caps which screw on to mating threads on the container.

If the filter fits loosely enough in the hole of the lower container during filtering, so that the gap consititutes a total area of a ¼" diameter circle, then another embodiment could place the ¼" diameter air leak required for dispensing the water in the sealing plug, cap, or other means instead of in the upper surface of the container. Or the leak could be also be ensured by a loose fit. A disigned loose fit could be ensured by, for example, making the hole roughened or slightly noncircular so that the circular filter and the sealing means would not fit too snugly.

The hole on the upper surfae need not be near the end of the container opposite the valve. It would be possible to move the lower container about so that its hole would be under the valve of the upper container even if its hole were in some other location on the upper surface of the container.

Filters using chemical principles other than those taught here can be used.

The upper container may be placed on a table or other furniture rather than on a specially designed box support as taught above.

All dimensions in the preferred embodiment can be adjusted larger or smaller by one skilled in the art, and the materials can be other than plastic. Much larger systems made of other materials might be of use for industrial or restaurant purposes.

There could, of course, be inconsequential differences between the two containers; they could be of different general shape even though of approximately equal volume.

The foregoing description of the preferred embodiment of the invention has been presented for the purpose of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An inexpensive, convenient, and simple invention for filtering water, comprising two substantially equal and interchangeable containers, each with a water-dispensing valve on a side near the bottom, said valves extending below the bottom of the respective containers, each container also having a hole on top, through which water may enter, a filter first structured to rest in the hole of a first, lower, container, a second upper container, means to support said upper container above said lower container and means to ensure air leaks in both containers so that water is driven by gravity out said valve of said upper container, through said filter, and into said lower container.

2. The invention of claim 1 wherein sealing means are provided for the first holes of said containers and wherein a second hole, is located on top each container, to provide an air leak into the containers with the sealing means being in place.

3. The invention of claim 1 wherein sealing means are provided for the first holes of said containers and wherein a small hole is present in said sealing means to provide an air leak into the containers with the sealing means being in place.

* * * * *